United States Patent [19]

Schreib

[11] Patent Number: 5,889,825
[45] Date of Patent: Mar. 30, 1999

[54] METHOD OF PARAMETERIZING A RECEIVING DEVICE, AND ALSO A CORRESPONDING RECEIVING DEVICE AND RADIO STATION

[75] Inventor: Franz Schreib, Munich, Germany

[73] Assignee: Siemens Aktiengesellschaft, Munich, Germany

[21] Appl. No.: 794,454

[22] Filed: Feb. 4, 1997

[30] Foreign Application Priority Data

Feb. 9, 1996 [DE] Germany .................. 196 04 772.2

[51] Int. Cl.$^6$ ................ H04B 7/10; H04B 7/02; H04L 1/02

[52] U.S. Cl. .................. 375/347; 375/347; 375/346; 375/260; 375/267; 375/231; 375/232; 375/233; 455/59; 455/296; 455/303; 455/504; 455/506

[58] Field of Search ................ 375/346, 347, 375/231, 232, 233, 267, 260; 455/59, 504, 506, 296, 303

[56] References Cited

U.S. PATENT DOCUMENTS

| | | | |
|---|---|---|---|
| 4,217,586 | 8/1980 | McGuffin | 342/380 |
| 5,185,764 | 2/1993 | Baier | 375/231 |
| 5,199,047 | 3/1993 | Koch | 375/231 |
| 5,231,648 | 7/1993 | Driedger et al. | 375/231 |
| 5,297,168 | 3/1994 | Sant' Agostino et al. | 375/347 |
| 5,457,711 | 10/1995 | Kellermann | 375/347 |
| 5,533,067 | 7/1996 | Jamal et al. | 375/341 |
| 5,566,209 | 10/1996 | Forssen et al. | 375/262 |
| 5,621,769 | 4/1997 | Wan et al. | 375/347 |
| 5,796,788 | 8/1998 | Bottomley | 375/341 |

FOREIGN PATENT DOCUMENTS

WO 91/07829  5/1991  WIPO .

OTHER PUBLICATIONS

IEEE Transactions on Acoustics, Speech and Signal Processing, vol. 37, No. 7, Jul. 1989, Richard Roy et al, ESPRIT—Estimation of Signal Parameters Via Rotational Invariance Techniques, pp. 984–995.

IEEE Proceedings (1990), Wolfgang Koch, Optimum and Sub–Optimum Detection of Coded Data Disturbed by Time–Varying Intersymbol Interference, pp. 1679–1684.

M. Mouly et al, The GSM System for Mobile Communications, 49. Rue Louise Bruneau, F–91120 Palaiseau, France, pp. 231–237.

Primary Examiner—Stephen Chin
Assistant Examiner—Michael W. Maddox
Attorney, Agent, or Firm—Hill & Simpson

[57] ABSTRACT

In the method for parameterizing at least one receiving device and a receiving device for a radio station, a plurality of decorrelated signals are received by an intelligent antenna device. Antenna weighting factors for suppressing received disturbances and channel coefficients for balancing out the differences in transit time of different signal components of a received signal are determined simultaneously. During a training sequence, test data present in the receiving device is rated in a channel model with channel coefficients and received test data is rated with antenna weighting factors and superposed to form antenna data or model variables. The minimizing of the deviation of antenna data and model variables is performed with the exclusion of the trivial solution. The method is suitable in particular for base stations in mobile radio systems.

19 Claims, 3 Drawing Sheets

METHOD OF PARAMETERIZING A RECEIVING DEVICE, AND ALSO A CORRESPONDING RECEIVING DEVICE AND RADIO STATION

BACKGROUND OF THE INVENTION

The present invention relates to a method of parameterizing a receiving device with an assigned intelligent antenna device in a radio system and to a receiving device or a radio station having at least one receiving device.

In a radio system, information is transmitted from a transmitting radio station to a receiving radio station. This information reaches the receiving radio station in the form of received signals. Due to diverse external influences, the received signals reach the receiving radio station via a number of paths. The signal components corresponding to the various paths arrive at the receiving radio station at successive points in time. In the receiving radio station there is then the problem of equalizing these signal components, which may be additionally influenced by further disturbing components, correcting the errors and decoding the transmitted information.

A radio station has an antenna device, which may be, as known from R. Roy, T. Kailath, "Esprit—Estimation of Signal Parameters Via Rotational invariance Techniques", IEEE Transactions on acoustics, speech and signal processing, Vol. 37, No. 7, July 1989, pages 984–995, an intelligent antenna device that has a plurality of antenna elements, and a receiving device, which performs the evaluation of the received signals. For the evaluation of the received signals, parameters are determined within the receiving device. These parameters are, for example, antenna weighting factors, which rate the individual received signals of the antenna elements of an intelligent antenna device, and channel coefficients known from W. Koch, "Optimum and sub-optimum detection of coded data disturbed by time-varying intersymbol interference", IEEE Proceedings 1990, pp. 1679. These channel coefficients, used in a channel model, serve the purpose of suitably superposing the various successively arriving signal components of a received signal.

It is also known to feed the antenna data, obtained from the received signal by transmission into the baseband and analog/digital conversion, and also to feed the channel coefficients to a detector, which equalizes the antenna data and performs the error correction. The symbols of the signals reconstructed in the output of the detector are then decoded in a decoder, for example a Viterbi decoder.

It is also known from mobile radio systems, see M. Mouly, M.-B. Pautet, "The GSM System for Mobile Communications", 49, rue Louise Bruneau, F-91120 Palaiseau, France, pages 231–237, to use so-called training sequences in order to adjust receiving radio stations. At predetermined points in time, the transmitting radio station transmits a sequence of digital data, which is known to the receiving radio station, that is, the data is present in undistorted form in the receiving radio station.

SUMMARY OF THE INVENTION

It is an object of the present invention to provide a method of parameterizing a receiving device of a radio station, and also such a receiving device or a radio station in a radio system, which permits an equalization and error correction with high accuracy.

In a radio station with a receiving device and assigned intelligent antenna device, at least two mutually and at least partially decorrelated received signals are received. The received signals are then converted in the receiving device into digital signals and are rated, in each case with antenna weighting factors, in a spatial channel estimator, associated with the receiving device. The at least two rated signals are superposed to form antenna data. Furthermore, the receiving device contains a channel model, by which the radio channel between the transmitting radio station and the receiving radio station can be reproduced. The channel model is characterized in this case by channel coefficients. The antenna data and the specific channel coefficients are fed to a detector, contained in the receiving device, for the equalization and error correction of the antenna data.

During a training sequence, the signals represent received test data, which are, additionally present in undisturbed form in the receiving device. Antenna data assignable to the received test data and model variables derived from the channel model fed with the test data are fed to an arithmetic unit. In the arithmetic unit, which is likewise associated with the receiving device, the antenna weighting factors for suppressing received disturbances and the channel coefficients for balancing out the differences in transit times of various signal components of a received signal are then determined simultaneously. For this purpose, an algorithm is used which performs the minimizing of the deviation of antenna data of the training sequence and model variables of the training sequence. Thereafter, the specific antenna weighting factors and channel coefficients can be used for rating the signals in other than the training sequence.

The combination of spatial channel estimator and channel model, and also the simultaneous calculation of the parameters for the antenna weighting factors and the channel coefficients in an arithmetic unit bring about a significant improvement in the mode of operation of the receiving device with respect to the reconstruction of transmitted information. With a simple algorithm, the parameters required for setting the receiving device can be jointly determined. When doing so, account must be taken of the constraint that the trivial solution, with antenna weighting factors and channel coefficients set to the value zero, is excluded. A corresponding constraint must be provided in the algorithm.

Depending on the number of partially decorrelated received signals present in the receiving device, an improved disturbance signal suppression and a balancing of the multipath propagation can be performed. For the complete elimination of disturbance signals, the number of at least partially decorrelated received signals must be obtained from the addition of one to the number of disturbance signals to be taken into consideration multiplied by the number of channel coefficients. However, two at least partially decorrelated received signals or any other number between these two limits produces a significant improvement in the reception quality, whereby a gain in system performance is also obtained if the radio station is used in a radio system, for example, a mobile radio system, wherein a greater density of mobile stations is made possible.

The mutually at least partially decorrelated received signals may advantageously be fed to the evaluation by the receiving device by separate antennas or by repeated sampling by one antenna, but with different radiation patterns in each case. If separate antennas with different radiation patterns are used, they do not have to be further controlled by the receiving device. If only one antenna is used, the expenditure is reduced, but the generation of different radiation patterns with respect to an information element to be evaluated in the received signals requires an additional electronic control means.

According to further refinements of the subject matter of the present invention, the algorithm for determining the antenna weighting factors and the channel coefficients is formed with the exclusion of the trivial solution such that there are in the receiving device a plurality of sets of antenna weighting factors, with which the received test data is rated in each case. The channel coefficients with a minimal deviation of antenna data and model variables are then determined. The solution with the least deviation, that is, the associated antenna weighting factors and channel coefficients determined for them, is selected and serves for parameterizing the receiving device. This solution reduces the arithmetic computation to the determination of the channel coefficients, whereas the antenna weighting factors are selective from a set of known antenna weighting factors.

An alternative variant is to use the calculation of least squares or a correlation calculation for determining the antenna weighting factors and the channel coefficients without preselection and consequently, with the somewhat greater arithmetic computation accepted, to select the antenna weighting factors and channel coefficients from an infinitely large set of possible values, but again with the exclusion of the trivial solution. The trivial solution, in which antenna weighting factors and channel coefficients are set to zero, corresponds to one possible, but nonsensical solution. Consequently, it is necessary to fix one of the antenna weighting factors or channel coefficients at a value not equal to zero.

According to a further advantageous refinement of the subject-matter of the present invention, a synchronization of the received test data with the test data processed in the channel model is performed before the final determination of the antenna weighting factors and the channel coefficients. Due to an unforeseeable transit time of the received signals of the training sequence between transmitter and receiver, the point in time of the arrival of the received test data in the receiving device cannot be predicted with complete certainty. To ensure the beginning of the training sequence and an effective calculation of the antenna weighting factors and channel coefficients without any disturbing influence of inadequate synchronization, a delay is therefore calculated, to which the received signals are subjected in the receiving device. The delay may be determined, for example, by performing a minimization of the deviation at a plurality of positions of the data stream of the antenna data and selecting the optimum solution, corresponding to synchronization. Then the delay is also used outside the training sequence.

Furthermore, it is advantageous to use the calculated antenna weighting factors not only for reception, but also during transmitting within the same traffic relation, for which there are reciprocal propagation conditions between transmitting and receiving radio stations. By this measure it is possible to achieve a spatial selectivity of the radiation pattern. As a result, undesired interferences can also be avoided and a greater capacity of the overall radio system can be achieved. If the transmitting frequency and receiving frequency deviate from each other, a transformation of the antenna weighting coefficients must be performed, so that the antenna pattern in the transmitting direction corresponds to that in the receiving direction.

The present invention is also a radio station, the receiving device of which is designed correspondingly for carrying out the parameterization. Advantageously, this radio station is used in radio systems which operate with time-division multiplexing, and the parameterizing is newly determined for each individual time slot. An example of a radio system operated by time-division multiplexing is that of mobile radio systems (such as GSM), the radio station being operated as a base station. The receiving device or radio station according to the present invention and the method according to the present invention are appropriate in particular for the special conditions of a mobile radio system, since the mobility of communication terminal devices results in changing propagation conditions, to which the parameterizing of the receiving device can be correspondingly adapted.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
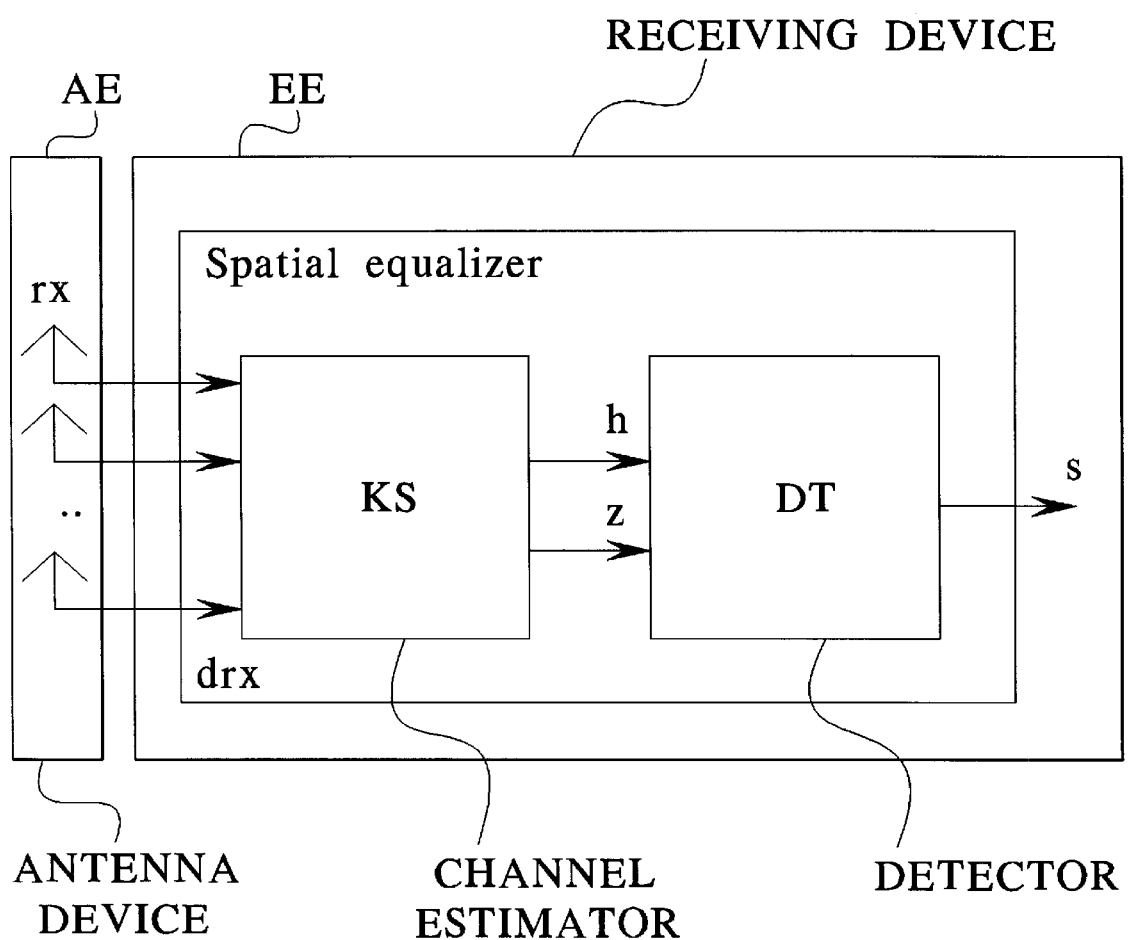
FIG. 1 shows a block diagram of a radio station.

Represented in FIG. 1 are the receiving device EE and the assigned antenna device AE of a radio station. This radio station is part of a radio system and receives from a transmitting radio station of this radio system received signals rx. The radio system is, for example, a GSM mobile radio system, in which the radio station represented in FIG. 1 represents a base station. Base stations are respectively connected via an air interface to mobile parts, which represent, for example, the transmitting radio station. In the following, the receiving case is described for the base station; nevertheless, usually a bidirectional traffic relation exists, that is, the base station also has a transmitting device.

The antenna device AE is designed as an intelligent antenna device, that is, a plurality of antenna elements of this intelligent antenna device AE receive received signals rx at the same point in time. Due to the different radiation patterns of the antenna elements, consequently at least two mutually partially decorrelated received signals rx are picked up by intelligent antenna device AE. The decorrelation does not have to be complete here, it must just be ensured that there are partially or fully decorrelated received signals present for a transmitted information element, whereby additional particulars for the equalization and error correction can be obtained from the different received signals rx.

The at least partially decorrelated received signals rx may in this case also be generated in that, instead of a plurality of fixed antenna elements, the radiation characteristic on one or more antenna elements is controlled and, where there are different radiation characteristics, the same information element is sampled, whereby in turn mutually at least partially decorrelated received signals rx are present in the intelligent antenna device AE.

From the received signals rx, digital signals drx are generated, for example by a transmission into the baseband and subsequent analog/digital conversion, and are fed to a spatial equalizer, which is arranged within the receiving device EE. The special equalizer in this case contains a spatial channel estimator KS and a detector DT. The digital signals drx serve as input signals for the spatial channel estimator KS, which is connected to the detector DT and feeds to it antenna data z, derived from the digital signals drx, as well as, channel coefficients h, determined in the spatial channel estimator KS.

The detector DT performs an equalization and error correction of the antenna data z using the channel coefficients h, and generates symbols s, which are fed to further devices of the receiving device EE (not shown), in which a decoding and, if appropriate, further processing steps are then performed. The symbols s in this case represent the reconstructed signals rx, processed by equalization and error correction.

Figure 2:
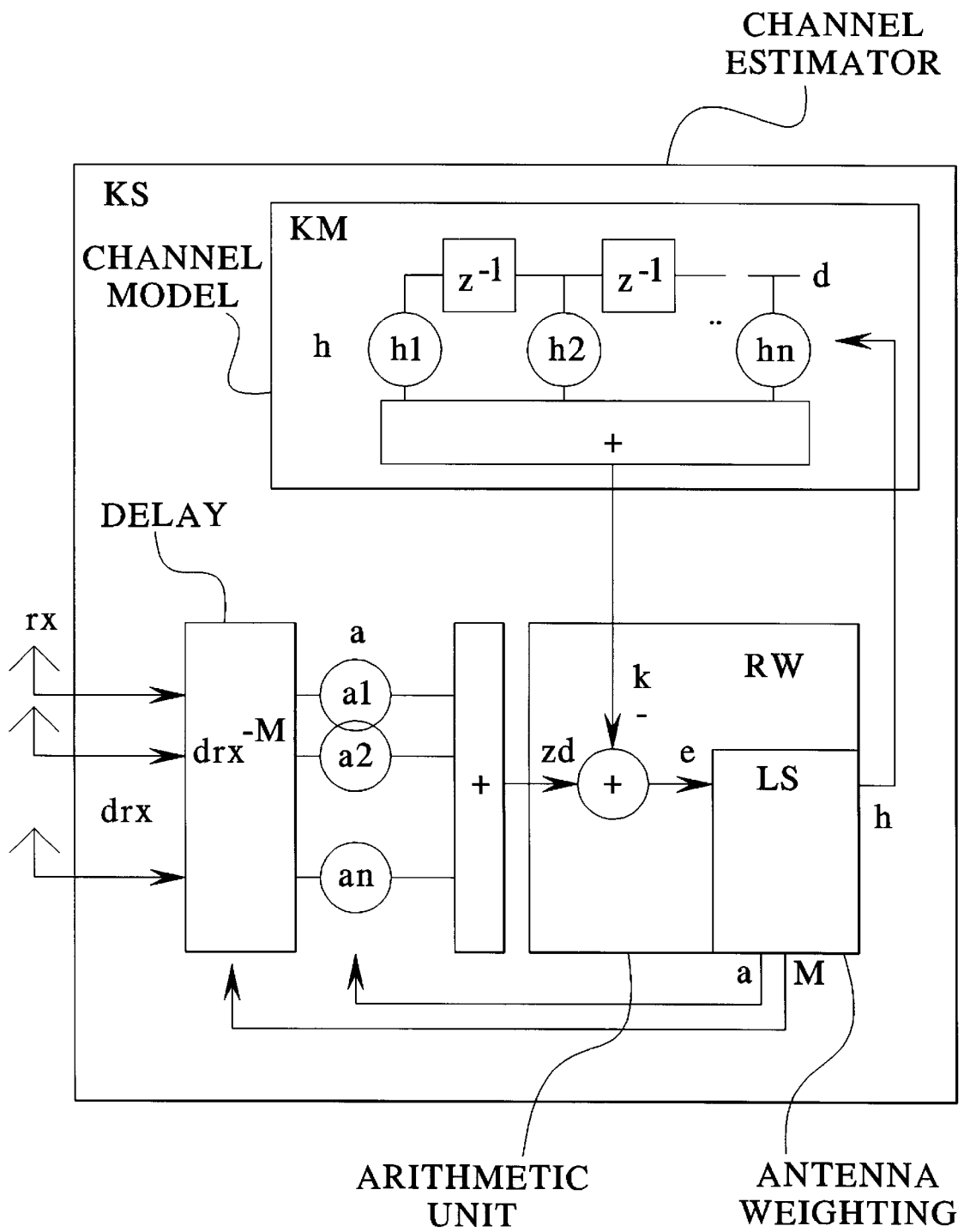
FIG. 2 shows a block diagram of a spatial channel estimator during parameterizing.

In FIG. 2, the mode of operation of the spatial channel estimator KS during parameterizing is explained. The parameterizing takes place during the reception of a training sequence. During this training sequence, the test data d is transmitted from a transmitting radio station to the receiving radio station, represented in FIG. 1. Affected by multipath propagation, disturbance and delay, the received signals rx arrive at the receiving radio station and are available to the spatial channel estimator KS as digital signals drx.

These digital signals drx are then stored in a memory element and are output with a delay by a delay M. The output digital signals drx are then respectively rated by antenna weighting factors a and are subsequently summed, the summation producing an element of an antenna data zd of the training sequence. Successive received signals rx thus produce the antenna data zd of the training sequence.

The test data d, already known in the receiving device EE, is fed to a channel model KM. This channel model KM has delay elements $z^{-1}$, which are arranged in the form of a chain. The test data d is run through these delay elements $z^{-1}$. The undelayed test data d and the delayed test data d, present at the output of each delay element $z^{-1}$, are respectively rated with a channel coefficient and are subsequently summed to form a model variable k. In this channel model KM the multipath propagation is simulated, successively arriving signal components being superposed to form a common signal. In mobile radio systems, three to four delay elements $z^{-1}$ are sufficient to balance out the multipath propagation. The model variables k are the output variables of the channel model KM.

The spatial channel estimator KS also contains an arithmetic unit RW, which compares the antenna data zd of the training sequence and the model variables k and determines the deviation e of the two values. The deviation e is fed within the arithmetic unit RW to a unit LS, which determines the antenna weighting factors a and channel coefficients h required for a minimal deviation e.

For parameterizing, the delay M is first determined. The unit LS solves the problem of least squares at a number of positions of the received data stream, which is formed by the antenna data zd of the training sequence. The position with the least square error represents the synchronization position. This also determines the delay M, which is used thereafter in the processing of the received signals rx, outside the training sequence as well, for the same time slot. In the solution of the problem of least squares, account must be taken of the constraint that it is necessary that not all the antenna weighting factors a and channel coefficients h are equal to zero. Therefore, for example, one of these values is preset to a value not equal to zero.

By this procedure, the synchronization and determination of the antenna weighting factors a and channel coefficients h are effected simultaneously. In the solution of the problem of least squares, the deviation e may advantageously be normalized by the sum of the squared channel coefficients h, whereby synchronization can be further improved. Instead of the solution of the problem of least squares, however, other suitable algorithms which bring about a minimization of the deviation e may also be used. The channel coefficients h, antenna weighting factors a and the delay M determined by the arithmetic unit RW are then used outside the training sequence as well for improving the reception of the receiving device EE.

Figure 3:
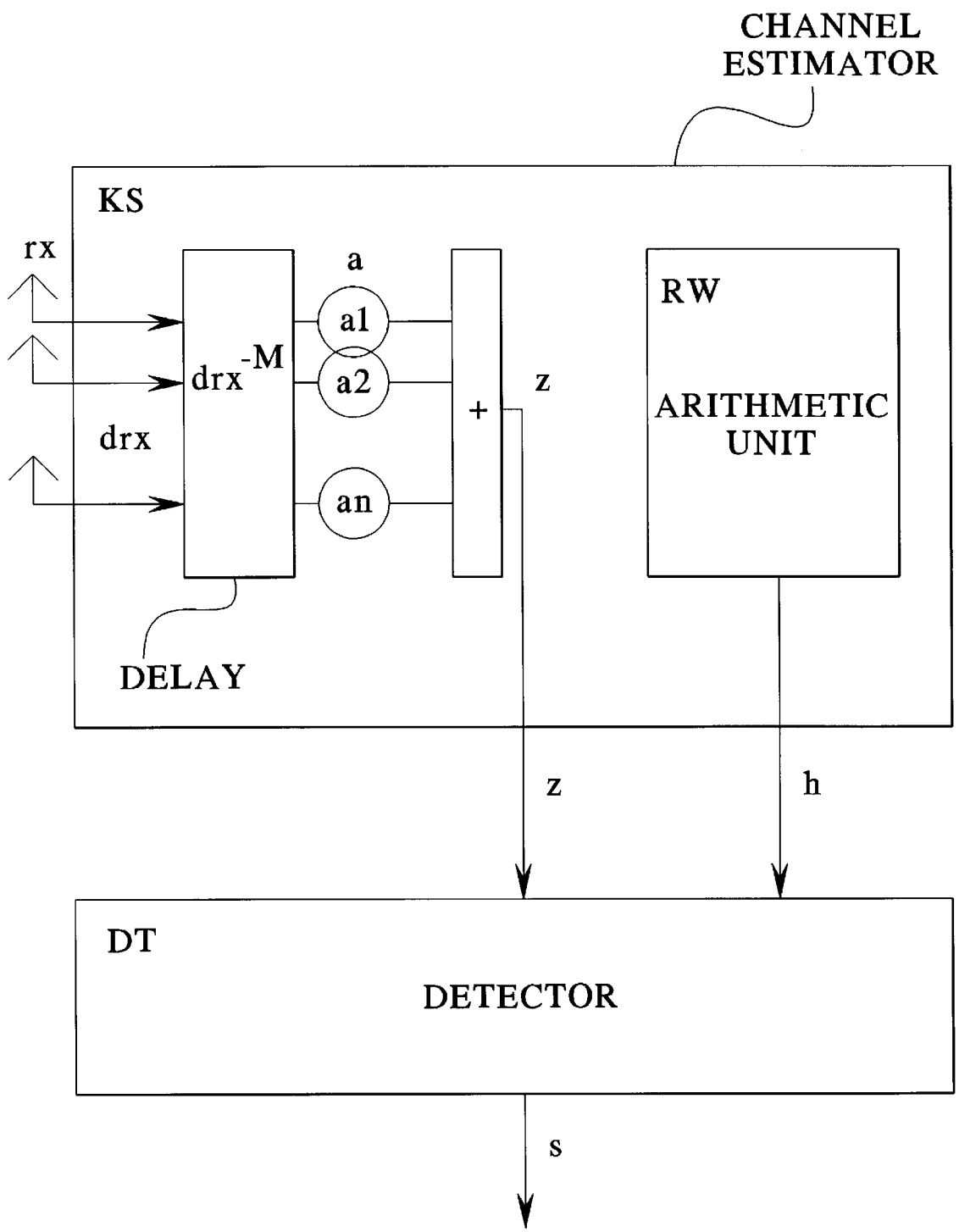
FIG. 3 shows a block diagram of the receiving device during reception with previously determined parameters outside the training sequence.

Represented in FIG. 3 is the reception and further processing of the received signals rx outside the training sequence. The spatial channel estimator KS picks up the digital signals drx and delays them according to the previously determined delay M before they are superposed to form antenna data z, having been rated by the specific antenna weighting factors a. This antenna data z is fed to the detector DT by the spatial channel estimator KS. Furthermore, the specific channel coefficients h are also transmitted from the spatial channel estimator KS to the detector DT.

This detector DT can then perform the equalization and error correction of the antenna data z and generate the signals. The receiving device EE according to the present invention in this case shows an improved suppression of disturbance signals, which is achieved by the combination of spatial filtering and the consideration of differences in transit times of signal components in a single algorithm. The number of mutually at least partially decorrelated received signals rx, in other words for example the number of antenna elements, plays a role in the effectiveness of the radio station according to the present invention or the method according to the present invention. The more independent signals there are, the better they can be processed. As a minimum, at least two partially decorrelated received signals rx must be provided. However, any greater number of partially correlated received signals rx may also be used. With a number of mutually decorrelated signals rx, which corresponds to the suppressed disturbance components multiplied by the number of channel coefficients h and added to one, a complete suppression of the disturbance components can be achieved.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for parameterizing a receiving device with assigned intelligent antenna device in a radio system, comprising the steps of:

receiving by the intelligent antenna device at least two mutually and at least partially decorrelated received signals;

respectively rating with antenna weighting factors in the receiving device digital signals derived from the received signals;

superposing the rated digital signals to form antenna data;

feeding the antenna data and channel coefficients, determined in a channel model that takes into consideration multipath propagation of the received signals, to a detector for equalization and error correction of the antenna data;

providing a training sequence in which test data present in the receiving device are received, in which antenna data assignable to the received test data and model variables derived from the channel model fed with the present test data is fed to an arithmetic unit;

simultaneously determining in the arithmetic unit antenna weighting factors for suppressing received disturbances and channel coefficients for balancing out differences in transit times of different signal components of a received signal, the antenna weighting factors and the channel coefficients being simultaneously determined using an algorithm which performs minimizing of deviation of antenna data of the training sequence and model variables of the training sequence; and using said antenna weighting factors and channel coefficients for rating received signals outside the training sequence.

2. The method according to claim 1, wherein the intelligent antenna device has separate antennas and the received signals are received by the separate antennas.

3. The method according to claim 1, wherein the received signals are received by one antenna by successive sampling with different radiation patterns.

4. The method according to claim 1, wherein the algorithm for determining the antenna weighting factors and the channel coefficients is formed with the exclusion of a trivial solution such that the received test data is rated with a plurality of predetermined sets of antenna weighting factors and the channel coefficients are determined with a minimal deviation of antenna data and model variables, and wherein a set of antenna weighting factors in which the deviation of antenna data and model variables is the least, and the associated specific channel coefficients, are selected.

5. The method according to claim 1, wherein the algorithm for determining the antenna weighting factors and the channel coefficients is formed, with the exclusion of a trivial solution such that the minimizing of the deviation of antenna data and model variables is performed by calculation of least squares.

6. The method according to claim 1, wherein, before determining the antenna weighting factors and the channel coefficients, a synchronization of the received test data with the test data processed in the channel model is performed by determining a delay and wherein the delay is also used in the rating of the received signals outside the training sequence.

7. The method according to claim 1, wherein within a common traffic relation, antenna weighting factors are also used when transmitting the antenna weighting factors used for transmitting corresponding to the antenna weighting factors used for receiving with antenna patterns in the two directions of transmitting and receiving.

8. A receiving device with assigned intelligent antenna device for receiving at least two mutually at least partially decorrelated received signals in a radio system, comprising:

a spatial channel estimator for rating digital signals derived from the received signals with antenna weighting factors and for superposing the digital signals to form antenna data;

a detector for equalization and error correction of the antenna data by evaluation of the antenna data and channel coefficients that are determined in a channel model and that take into consideration multichannel propagation of the received signals, the detector being connected to the estimator; and the estimator having an arithmetic unit for determination of the antenna weighting factors for suppressing received disturbances and of the channel coefficients for balancing out differences in transit times of different signal components of a received signal using an algorithm for minimizing deviation of antenna data of the training sequence and model variables of the test data, which is present in the receiving device, during a training sequence.

9. The receiving device according to claim 8, wherein the receiving device also provides rating of the received signals with the determined antenna weighting factors and channel coefficients outside the training sequence.

10. The receiving device according to claim 8, wherein the intelligent antenna device has at least two separate antennas which receive the received signals.

11. The receiving device according to claim 8, wherein the intelligent antenna device is structured such that the received signals are received by successive sampling of an input data symbol with different radiation patterns.

12. The receiving device according to claim 8, wherein the spatial channel estimator provides during the test sequence the rating of the signals with a plurality of predetermined sets of antenna weighting and wherein the arithmetic unit provides the determination of the channel coefficients such that a set of antenna weighting factors in which deviation of antenna data and model variables is least, and the associated specific coefficients, with exclusion of a trivial solution are selected.

13. The receiving device according to claim 8, wherein the arithmetic unit provides during the test sequence determining of the antenna weighting and of the channel coefficients with a minimal deviation of antenna data and model variables using least squares, with exclusion of a trivial solution.

14. The receiving device according to claim 8, wherein the arithmetic unit provides determining a delay for synchronization of received test data with test data processed in the channel model, independently of or in a manner dependent on a determination of the channel coefficients and antenna weighting factors, and wherein the spatial channel estimator also provides a delay in rating the signals for synchronization outside the training sequence.

15. The receiving device according to claim 14, wherein synchronization is effected in that a determination of the channel coefficients and antenna weighting factors is performed at a plurality of positions of the antenna data and a solution with least deviation is selected.

16. The receiving device according to claim 8, wherein the receiving device is used in a radio station.

17. The radio station according to claim 16, wherein within a common traffic relation, the antenna weighting factors are also used for rating transmitted signals.

18. The radio station according to claim 17, wherein the radio station is operated by time-division multiplexing and provides determination of each of the parameters for one time slot.

19. The radio station according to claim 17, wherein the radio station is operated as a base station in a mobile radio system.

* * * * *